United States Patent [19]

Marshall

[11] Patent Number: 4,822,553
[45] Date of Patent: Apr. 18, 1989

[54] APPARATUS AND METHOD FOR THERMOFORMING A PLASTIC ARTICLE HAVING AN UNDERCUT

[76] Inventor: Floyd M. Marshall, Rte. 2, County Hwy. 134, Nevada, Ohio 44849

[21] Appl. No.: 927,365

[22] Filed: Nov. 6, 1986

[51] Int. Cl.$^4$ .................. B29C 49/30; B29C 49/70
[52] U.S. Cl. .................. 264/292; 249/66 R; 249/122; 249/160; 249/167; 264/318; 264/549; 425/388; 425/422; 425/438; 425/443
[58] Field of Search ............... 425/395, 403, 412, 414, 425/422, 393, DIG. 5, 58, 577, 388, 438, 436, 441, 442, 443, 502, 387.1, 383; 264/292, 318, 334, 549–551, 553, 544; 249/66 R, 66 C, 67, 122, 160, 167

[56] References Cited

U.S. PATENT DOCUMENTS

| | | | |
|---|---|---|---|
| 3,126,582 | 3/1964 | Scott | 425/388 |
| 3,284,553 | 11/1966 | Edwards | 264/522 |
| 3,293,697 | 12/1966 | Balint | 264/344 |
| 3,337,664 | 8/1967 | Lyon | 264/547 |
| 3,530,537 | 9/1970 | Walker | 425/388 |
| 3,551,954 | 1/1971 | Knowles | 425/388 |
| 3,703,255 | 11/1972 | Wade | 425/388 |
| 3,905,240 | 9/1975 | Lovejoy | 425/DIG. 55 |
| 3,995,763 | 12/1976 | Ayres et al. | 425/398 |
| 4,286,766 | 9/1981 | Von Holdt | 425/DIG. 58 |
| 4,383,819 | 5/1983 | Letica | 425/577 |
| 4,495,135 | 1/1985 | White | 264/544 |
| 4,502,660 | 3/1985 | Luther et al. | 425/DIG. 58 |
| 4,609,339 | 9/1986 | Padovani | 249/122 |
| 4,627,810 | 12/1986 | Von Holdt | 425/DIG. 58 |

*Primary Examiner*—Willard E. Hoag
*Attorney, Agent, or Firm*—MacMillan, Sobanski & Todd

[57] ABSTRACT

The present invention concerns an apparatus and method for thermoforming a plastic article from a sheet of plastic material heated to a predetermined forming temperature. The apparatus includes a mold having forming surfaces defining a forming cavity generally conforming to the shape of the plastic article to be formed. The heated plastic sheet is urged into contact with the forming surfaces of the mold to form the plastic article. The mold includes at least one undercut forming element moveable between an advanced position wherein the element projects into the forming cavity to form an undercut portion in the plastic article and a retracted position wherein the element is withdrawn from the forming cavity to enable the formed plastic article to be removed from the forming cavity. After the plastic article has been formed, the undercut forming element is moved to the retracted position and a stripper plate is utilized to remove the formed plastic article from the forming cavity. In the preferred embodiment of the invention, the undercut forming element is retracted simultaneously with the stripping movement of the stripper plate to minimize the cycle time associated with producing the plastic article.

4 Claims, 4 Drawing Sheets

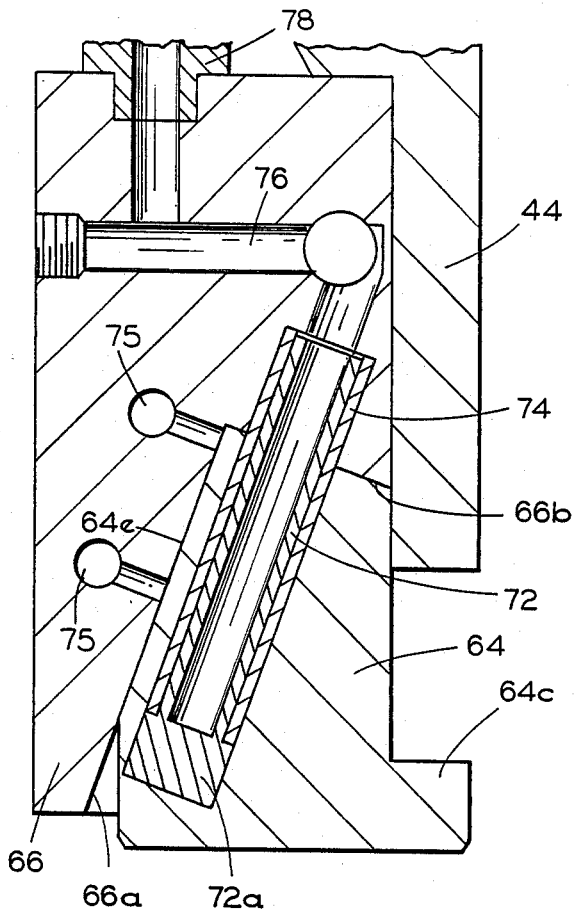
FIG. 5a
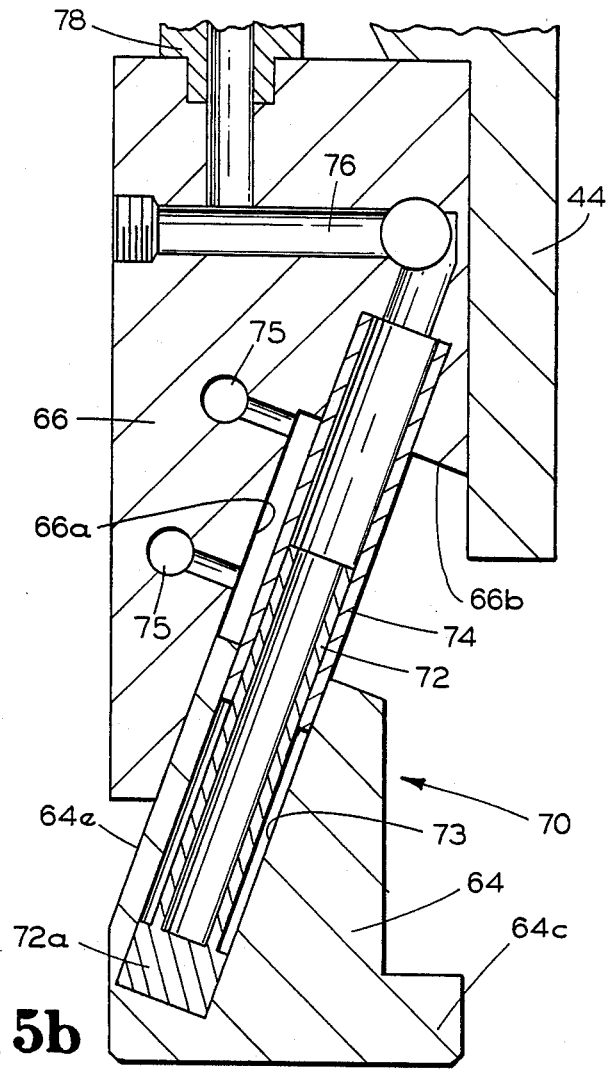
FIG. 5b
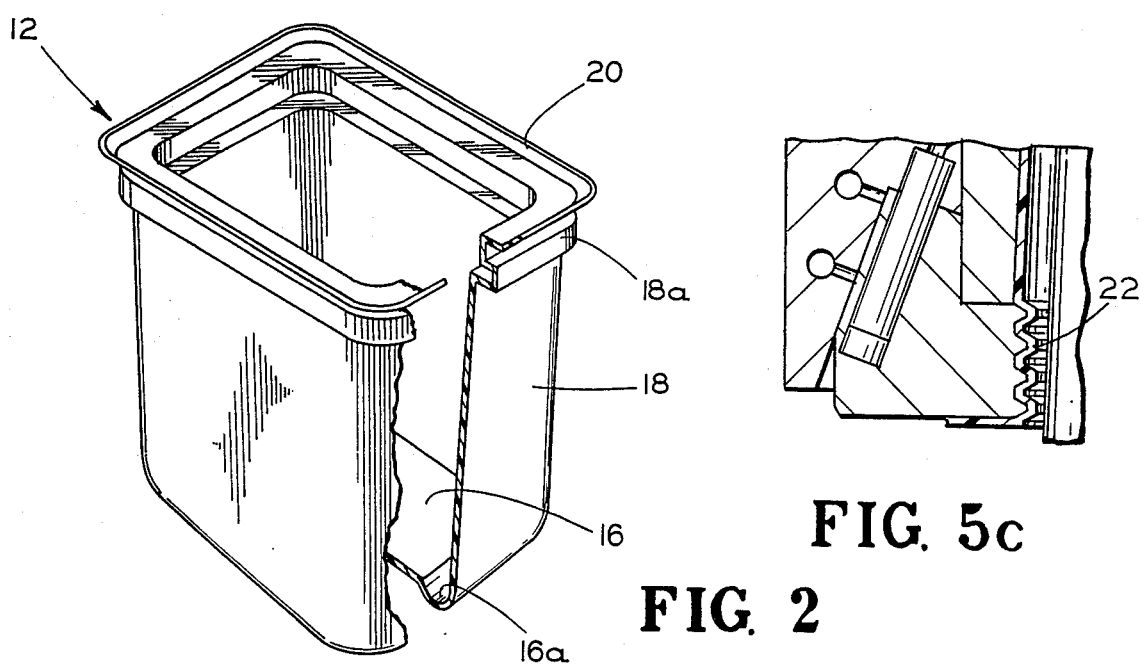
FIG. 2
FIG. 5c

APPARATUS AND METHOD FOR THERMOFORMING A PLASTIC ARTICLE HAVING AN UNDERCUT

BACKGROUND OF THE INVENTION

The present invention relates generally to an apparatus and method for thermoforming plastic articles and, in particular, to a thermoforming apparatus designed to form an undercut portion in the plastic article.

While thermoforming plastic articles from a heated sheet of plastic material may have production advantages over molding articles by the so-called injection molding process, one advantage of utilizing the injection molding process has been the ability to produce plastic articles in relatively complex shapes. For example, with injection molding, it is possible to produce relatively deep undercuts in various portions of a molded article. However, one of the practical limitations of the injection molding process relates to the minimum wall thickness which can be obtained in the molded article. The production of relatively thin walled articles by injection molding is difficult, if not impossible, to achieve. Also, the production rate of an injection molded process is far less than that of a thermoforming process.

By utilizing a thermoforming process, it is feasible to produce plastic articles such as containers, lids, and other plastic articles having relatively thin walls. As compared to an injection molding process, a thermoforming process has the advantage of relatively high speed production and considerably more economical tooling costs. However, the thermoforming technique has had the disadvantage of not adapting itself to rapid molding of complex shapes and, in particular, it has been difficult to efficiently produce a thermoformed article having an undercut portion.

It has been possible to produce undercuts in a plastic article by the thermoforming process by the use of expanding collets or split mold assemblies. However, the use of expanding collets or split molds greatly increase the complexity and tooling cost of the machinery. More importantly, expanding collets and split molds greatly increase the length of the production cycle of the plastic article.

There have been several developments directed to producing an undercut portion in a thermoformed plastic article. One such development includes the use of cooled mold portions which impinge upon selected areas of a heated plastic sheet and rigidify the same so that the uncooled portions can be folded to form an undercut or reverse bend section. Such an approach is disclosed in more detail in U.S. Pat. No. 3,284,553.

Another approach to producing undercut portions in a thermoformed plastic articles is disclosed in U.S. Pat. No. 3,337,664. This patent discloses the use of differential air pressure across selected portions of the heated plastic sheet to cause an undercut portion to be formed in the plastic article.

Still another approach to forming undercut portions in thermoformed plastic articles is disclosed in U.S. Pat. No. 3,126,582. In this patent, a sheet of plastic material is vacuum formed around a mold member carrying a piece of resilient material which projects beyond the edge of the adjacent mold section to form the undercut portion, and which flexes to facilitate stripping of the formed article from the mold without the need of having a movable mold member.

One approach to forming undercut portions in an injection molded article is disclosed in U.S. Pat. No. 4,383,819. This patent discloses an injection mold which utilizes movable undercut forming elements which project into the mold cavity and are simultaneously moved outwardly from the mold cavity as the molded product is removed from the mold cavity. However, this mold cannot be used in a thermoforming operation.

SUMMARY OF THE INVENTION

The present invention concerns an unique apparatus and method for forming an undercut portion in a thermoformed plastic article. The forming apparatus of the present invention includes mold means having forming surfaces defining a forming cavity generally conforming to the shape of the plastic article to be formed. The forming apparatus further includes means for urging a portion of a heated sheet of thermoplastic material into contact with the forming surfaces of the mold means to form the plastic article.

The mold means includes at least one undercut forming element moveable between an advanced position wherein the element projects into the forming cavity to form an undercut portion in the plastic article and a retracted position wherein the element is withdrawn from the forming cavity to enable the formed plastic article to be removed from the forming cavity. When the undercut forming element is in the advanced position, the element engages the undercut portion of the plastic article to prevent the article from being removed from the forming cavity. Retracting means are provided for moving the undercut forming element to the retracted position, and stripper means are provided for removing the formed plastic article from the forming cavity. In the preferred embodiment of the invention, the stripper means initially moves the formed plastic article a first predetermined distance along the forming axis relative to the forming cavity. Simultaneously, the retracting means is operable with the stripper means for retracting the undercut forming element to the retracted position as the formed plastic article is moved the first predetermined distance. The stripper means is further operable to move the formed plastic article a second predetermined distance along the forming axis relative to both the forming cavity and the undercut forming element. Also, means are provided for maintaining the undercut forming element stationary relative to the forming cavity as the formed plastic article is moved the second predetermined distance.

In the preferred embodiment of the invention, the components utilized to form the undercut portion in the plastic article are incorporated into a stripper plate assembly utilized to remove the formed plastic article from the forming cavity. The components include a plurality of moveable undercut forming elements which, when they are in an advanced position, cooperate to form an enclosed forming ring which extends into the forming cavity to form an undercut portion in the plastic article. As the stripper plate assembly is moved in one direction to remove the plastic article from the forming cavity, the mold segments are simultaneously moved in the one direction and outwardly along a tapered guide surface until the segments have moved sufficiently outwardly to enable the plastic article to be removed from the forming cavity.

It has been found that the apparatus and method of the present invention offers several advantages over the prior art approaches to forming undercuts in thermoplastic materials. First, with the present invention, the number of additional components required to form the undercut portion is greatly minimized as compared to prior art structures. Moreover, the undercut forming mechanism of the present invention is sufficiently compact such that a plurality of individual forming mechanisms can be closely spaced to one another in a single tool assembly, thus enabling a number of plastic articles to be formed simultaneously with a minimum of material waste. Also, since the undercut forming elements can be retracted simultaneously with the stripping operation of the plastic article from the forming cavity, the production cycle is minimized.

BRIEF DESCRIPTION OF THE DRAWINGS

The above, as well as other advantages of the present invention, will become readily apparent to one skilled in the art from reading the following detailed description in conjunction with the attached drawings, in which:

FIG. 2 is a perspective view, partly broken away, illustrating a plastic article having an undercut portion formed therein by means of the apparatus of the present invention;

FIG. 5a is an enlarged sectional view taken along the line 5a—5a of FIG. 3b, and illustrating the air spring unit shown in FIG. 1 in the retracted position;

FIG. 5b is an enlarged sectional view taken along the line 5b—5b of FIG. 4b, similar to FIG. 5a, but showing the air spring unit in the extended position; and FIG. 5c is a sectional view, similar to FIG. 5a, but illustrating an undercut forming element adapted to form external threads on the molded plastic article.

DESCRIPTION OF THE PREFERRED EMBODIMENT

Figure 1:
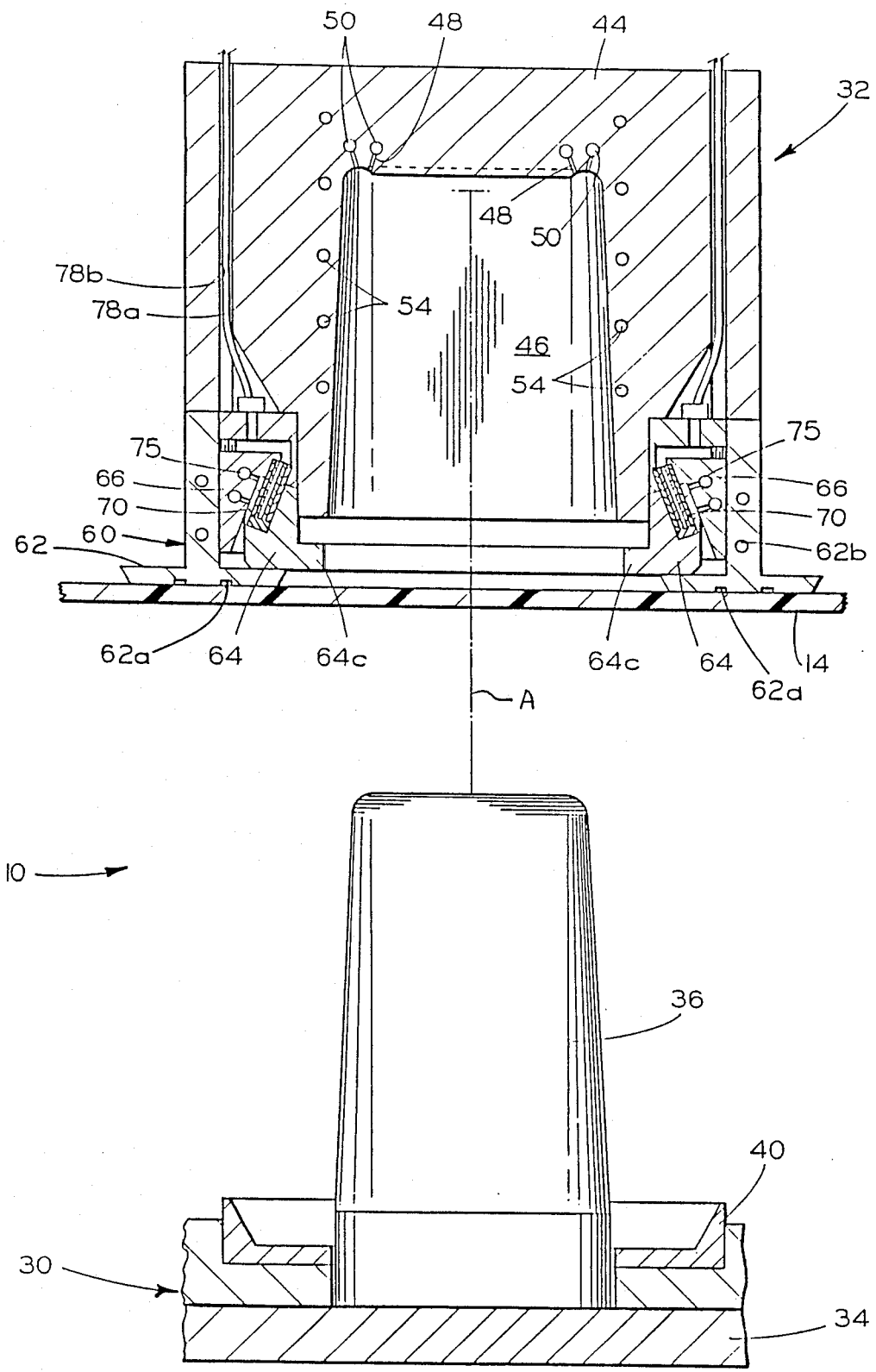
FIG. 1 is a sectional view of a portion of the forming apparatus of the present invention, illustrating the relative positions of the forming components prior to a lower mold section forcing a portion of a sheet of heated thermoplastic material into the forming cavity of an upper mold section.

Referring now to the drawings, and particularly to FIG. 1, there is shown a portion of a thermoforming apparatus 10 for forming a plastic article, similar to the article 12 shown in FIG. 2, from a heated sheet 14 of thermoplastic material. As shown in FIG. 2, the plastic article 12 includes a generally rectangular base 16 surrounded by a rectangular recessed portion 16a, and tapered walls 18 extending upwardly and slightly outwardly from the base 16. The walls 18 are provided with an annular undercut portion 18a spaced downwardly from an enlarged rectangular upper rim portion 20 formed around the upper edge of the walls 18.

Basically, the present invention is directed to an apparatus and method for forming undercut portions in thermoformed plastic articles. While the apparatus 10 illustrated in the drawings is specifically designed to form the undercut portion 18a in the article 12, it will be appreciated that the apparatus could readily be adapted to form other types of articles having different undercut configurations such as, for example, an externally threaded portion 22 as illustrated in FIG. 5c. For example, the article could be of a cylindrical design and/or the undercut portion could be located at a different location along the wall of the article. Further, as will be appreciated, means can be provided for forming more than a single undercut portion along the sidewall of the plastic article. Also, while the drawings illustrate only the portion of the forming apparatus utilized for producing a single plastic article, the forming apparatus can include a plurality of similar forming mechanisms for simultaneously forming a plurality of plastic articles.

Referring again to FIG. 1, the heated sheet 14 of thermoplastic material may be polyethylene, polystyrene, or other well known thermoplastic materials. The thermoplastic material is initially extruded into sheet form, and is then fed into a heating station (not shown) where it is heated to the desired forming temperature. From the heating station, the heated sheet 14 is fed into the forming apparatus 10 such that, as shown in FIG. 1, the sheet 14 is positioned between a lower mold section 30 and an upper mold section 32. In order to facilitate handling of a plurality of formed articles attached to a web of plastic material, the forming apparatus 10 is adapted to form the articles in a position which is inverted from the position shown in FIG. 2. While not shown in the drawings, conventional means are provided for moving the lower mold section 30 and the upper mold section 32 toward and away from one another along an axial path designated in FIG. 1 as forming axis A.

The lower mold section 30 includes a main body portion 34 having an upwardly extending, generally rectangular, assist plug 36 securely attached thereto. As will be discussed, the assist plug 36 is utilized to initially force a portion of the sheet of the heated thermoplastic material upwardly into a forming cavity provided in the upper mold section 32. The lower mold section 30 also includes a rectangular clamping ring 40 which is utilized to securely retain the thermoplastic sheet between the upper and lower mold sections during the forming operation.

The upper mold section 32 includes a forming die 44 which is provided with a downwardly facing forming cavity 46 generally conforming to the outer configuration of the lower portion of the plastic article 12. The forming die 44 is provided with a plurality of spaced apart vacuum ports 48 opening into the upper portion of the forming cavity 46. The ports 48 communicate with vacuum passageways 50 coupled to a suitable vacuum source (not shown). As will be discussed, after the thermoplastic material is forced into the cavity 46, vacuum is applied to the ports 48 to pull the plastic material into engagement with the upper wall of the cavity 46 to form the rectangular recessed portion 16a of the plastic article 12. While not shown in the drawings, vacuum ports can be provided at other selected locations within the forming cavity 46 for assisting in pulling the thermoplastic material into engagement with the side walls of the forming cavity. The forming die 44 is also provided with a plurality of coolant passageways 54 for circulating a cooling fluid around the forming surfaces of the forming die to increase the rate at which the heated plastic article hardens.

As shown in FIG. 1, the apparatus 10 includes a stripper plate assembly 60 which is utilized to pull the formed plastic article from the forming cavity 46 subsequent to the forming operation. Also, in accordance with the present invention, the stripper plate assembly 60 defines the lower portion of the forming cavity 46 and is provided with means for forming the upper portion of the plastic article 12. More specifically, the stripper plate assembly 60 includes means for forming the undercut portion 18a of the plastic article 12.

Figure 3A:
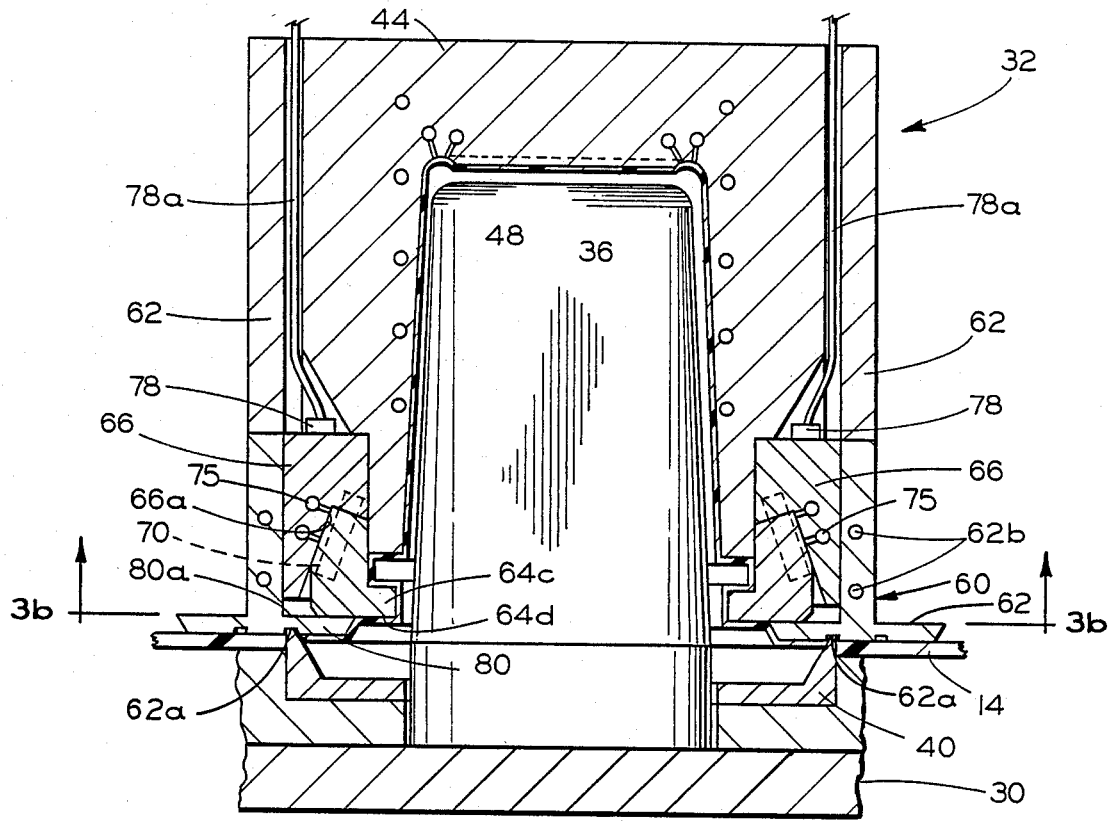
FIG. 3a is a sectional view, similar to FIG. 1, but showing the components of the apparatus after the thermoplastic material has been pressed into the forming cavity and has been urged outwardly into contact with the walls of the forming cavity to form a plastic article having a shape as shown in FIG. 2.

The stripper plate assembly 60 includes a stripper plate member 62 which is mounted for selective vertical movement toward and away from the upper mold section 30. In FIGS. 1 and 3a, the plate member 62 is in its uppermost position while, in FIG. 4a, the plate member 62 has been moved to a lower position to pull the formed plastic article from the forming cavity 46. While not shown in the drawings, conventional means are provided for controlling the vertical movement of the stripper plate member 62. The lower surface of the stripper plate member 62 is provided with an rectangular recessed portion 62a which, as shown in FIG. 3a, cooperates with the rectangular clamping ring 40 of the lower mold section 30 for securing the thermoplastic sheet 14 between the upper and lower mold sections during the forming operation. Also, the stripper plate member 62 is provided with coolant passageways 62b for circulating a suitable cooling fluid about the lower end of the forming cavity 46.

Figure 3B:
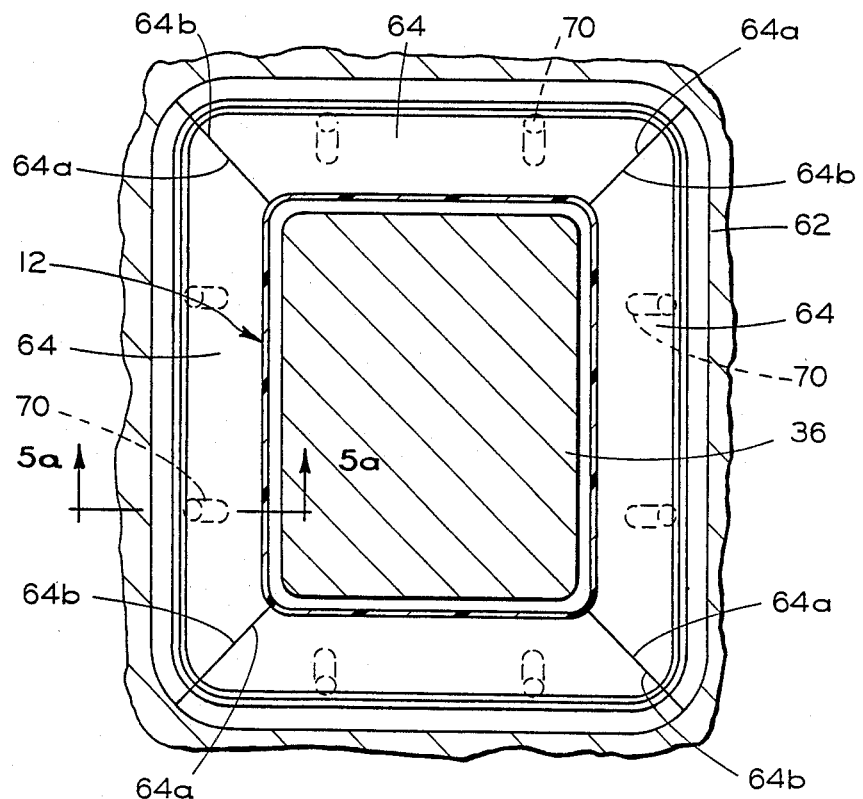
FIG. 3b is a sectional view taken along the line 3b—3b of FIG. 3a, and illustrating the moveable mold segments in an advanced position.
Figure 4A:
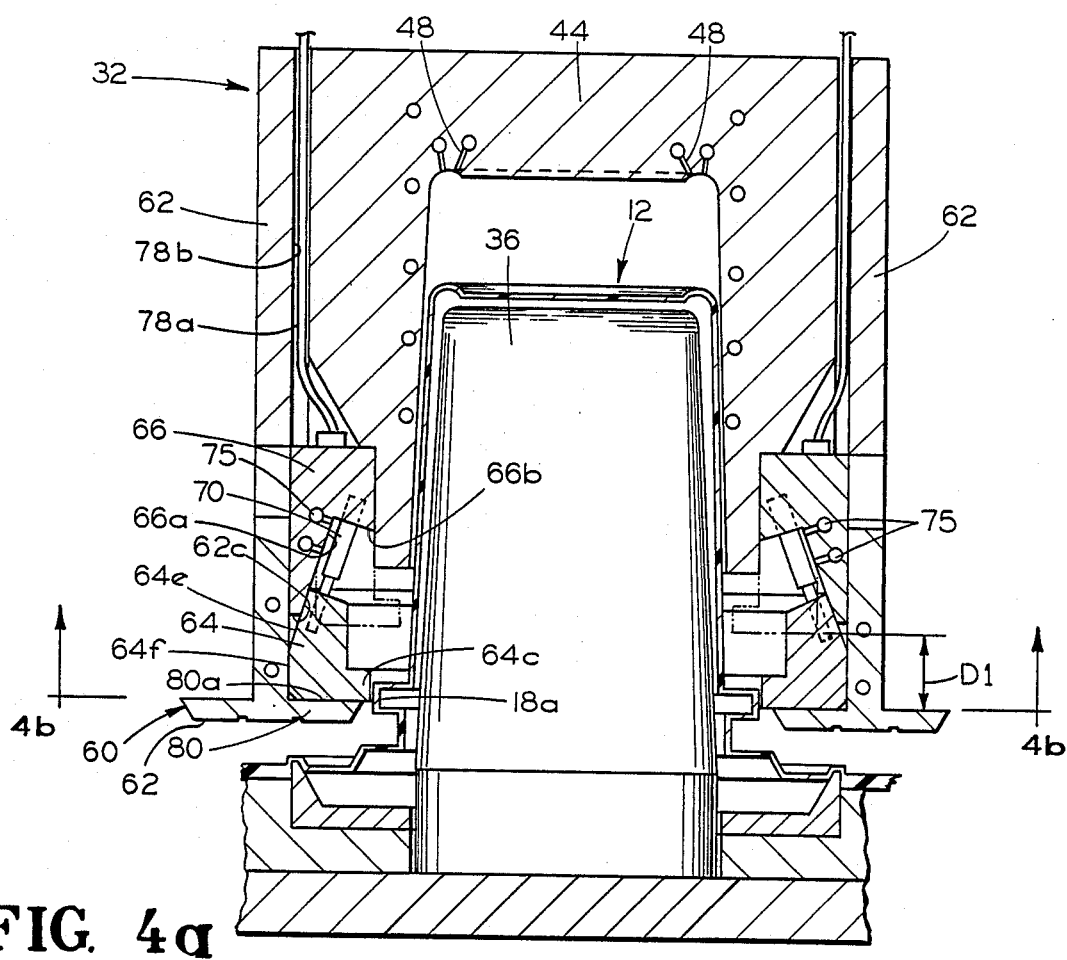
FIG. 4a is a sectional view, similar to FIG. 3a, but showing the mold segments in a retracted position as the stripper plate assembly is moved downwardly to remove the plastic article from the forming cavity.
Figure 4B:
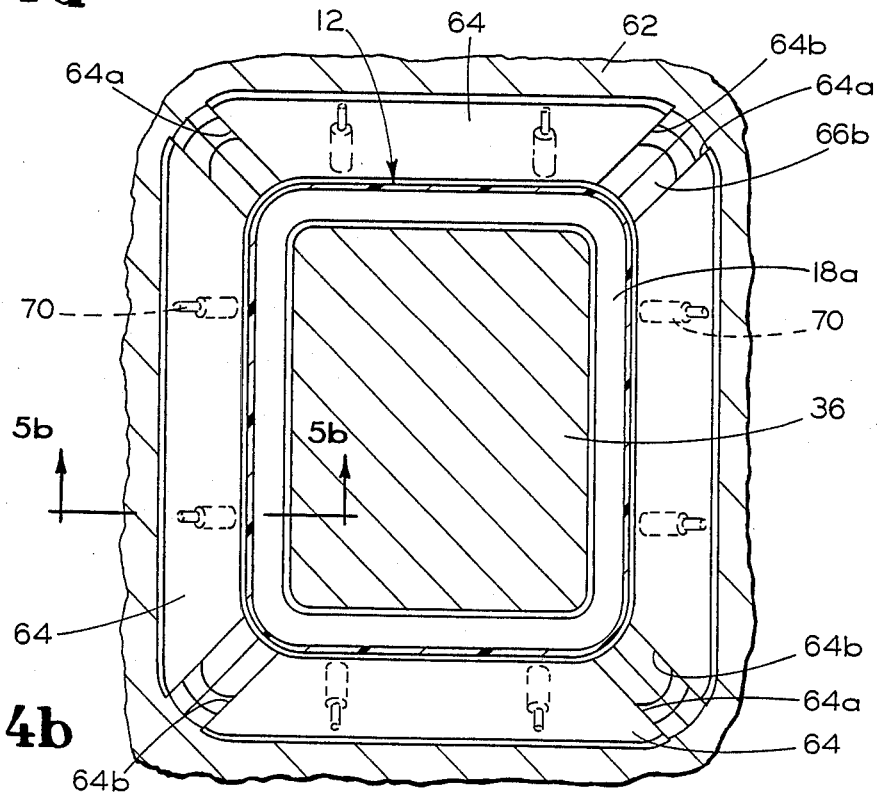
FIG. 4b is a sectional view taken along the line 4b—4b of FIG. 4a, and illustrating the individual mold segments in a retracted position to enable the plastic article to be removed from the forming cavity.

The stripper plate member 62 is provided with a hollow rectangular portion for housing the components required to form the undercut portion 18a. More specifically, these components include a plurality of peripherally positioned undercut forming elements or movable mold segments 64, and a generally rectangular guide ring 66 secured about the lower end of the forming die 44. As will be discussed, the mold segments 64 are mounted for selective movement along inclined guide surface 66a provided on the guide ring 66. When the mold segments 64 are in an advanced position as shown in FIGS. 1 and 3a, the end surfaces 64a and 64b (shown in FIG. 3b) of the segments mate with one another to form a complete enclosed rectangular forming ring 64c which projects into the forming cavity 46 to form the undercut portion 18a. When the mold segments 64 are in the advanced position, the ring portion 64c prevents the formed plastic article from being removed from the forming cavity 46. When the mold segments 64 are in a retracted position, as shown in FIGS. 4a and 4b, the segments have been moved downwardly and outwardly along the guide surface 66a a sufficient distance to enable the plastic article to be pulled from the forming cavity. As will be discussed, the movement of the mold segments is controlled by the stripper plate member 62 and the use of a plurality of air springs 70 which urge the segments 64 downwardly and outwardly along the guide surface 66a.

As shown in FIGS. 5a and 5b, each air spring 70 includes an inner sleeve 72 having an enclosed lower end 72a secured within a cavity 73 formed in the mold segment 64. The upper end of the inner sleeve 72 is adapted to be slideably received by the lower end of an outer sleeve 74 having an upper end secured within the guide ring 66. The hollow sleeve members are adapted to receive a supply of pressurized air through a passageway 76 formed in the guide ring 66. The passageway 76 is coupled to a pressurized air source by means of a fitting 78 and a line 78a which, as shown in FIG. 1 extends through an opening 78b formed in the upper mold section. Normally, the individual mold segments 64 are in the advanced position and the air spring 70 is in a compressed position, as shown in FIG. 5a. However, when it is desired to remove the formed plastic article from the mold, the stripper plate 62 moves downwardly, as shown in FIG. 4a, such that the pressurized air supplied to the interior of the sleeves 72 and 74 causes the air spring 70 to extend and move the mold segments 64 downwardly and outwardly along the respective guide surface 66a to the retracted position, as shown in FIG. 5b. The mold segments 64 can be returned to the advanced position and the air springs 70 can be compressed by means of the upward movement of the stripper plate 62. While the drawings illustrate the use of two spaced apart air springs 70 for each mold segment 64, more or less air springs could be used. Also, it will be appreciated that biasing means other than air springs can be used to control the movement of the mold segments.

A plurality of passageways 75 are formed in the ring 66 and terminate at the surface 66a. The passageways 75 can be connected to a suitable vacuum source or pressurized air source (not shown) for cleaning the surface 66a of any loose material which would interfere with the sliding movement of the segments 64. Also, while not shown in the drawings, passageways which terminate at the surface 66b can be provided.

While the sleeves 72 and 74 of the air spring 70 also function as a guide for controlling the movement of the mold segments 64, it may be desirable to provide additional guide pins (not shown) for controlling such movement. Also, while not shown in the drawings, it may be desirable to circulate a cooling fluid through the individual mold segments 64. This can be accomplished by connecting a flexible coolant line to each mold segment which can move with the reciprocating movement of the mold segments. The flexible coolant lines can be located in the upper mold openings 78b shown in FIG. 1.

In operation, the heated sheet 14 of thermoplastic material is positioned between the upper and lower mold sections as shown in FIG. 1. In FIG. 1, the stripper plate assembly 60 is positioned in its uppermost position such that the upwardly facing surface 80a (FIG. 3a ) of an annular lip 80 of the plate member 62 engages the lower surface 64d of the mold segments 64 to seat the mold segments within a rectangular groove formed in the guide ring 66 by the tapered guide surface 66a and an inclined surface 66b. When the mold segments 64 are seated within this groove in a manner as shown in FIGS. 1 and 3a, the end surfaces 64a and 64b of the mold segments 64 mate with one another, as shown in FIG. 3b, such that the segments 64 cooperate to form the enclosed undercut forming ring 64c.

Once the heated thermoplastic sheet 14 has been positioned between the upper and lower mold sections, the lower mold section 30 is moved upwardly such that the tapered assist plug 36 forces a portion of the thermoplastic sheet 14 into the forming cavity and the rectangular clamping ring 40 has secured the plastic sheet between the upper and lower mold sections. At this point, vaccum can be applied to the various vaccum ports opening into the forming cavity 46 while, simultaneously, pressure can be applied to the interior of the plastic article to force the plastic into contact with the forming walls of the cavity.

The cooled walls of the forming cavity 46 cause the thermoplastic material to harden more rapidly. When the plastic article is to be removed from the forming die 44, the lower mold section 30 is moved downwardly. As the lower mold section 30 begins to move downwardly, the stripper plate member 62 follows the lower mold section 30. The pressurized air provided to the air springs 70 causes the springs 70 to extend and maintain the mold segments 64 in engagement with the annular lip 80 of the stripper plate member 62 and maintain a sliding inclined surface 64e of the mold segments 64 in engagement with the tapered guide surface 66a of the guide ring 66. Thus, the mold segments 64 will simultaneously move downwardly with the stripper plate member 62 a distance D1, and outwardly from the plastic article 12 until the outer surface 64f of the mold segments 64 contacts the inner wall 62c of the hollow portion of the stripper plate. At this point, as shown in FIG. 4a, the mold segments 64 have moved outwardly sufficiently to enable the remaining portion of the plastic article to be moved downwardly relative to both the forming cavity and the undercut forming elements. During this time, the stripper plate 80 maintains the undercut forming elements stationary relative to the forming cavity. The web of formed plastic articles can then be transferred to a cutting station where the individual plastic articles can be cut from the plastic web.

In accordance with the provisions of the patent statutes, the principle and mode of operation of the present invention have been illustrated and described in what is considered to represent its preferred embodiment. However, it should be noted that the invention can be practiced otherwise than as specifically illustrated and described without departing from its spirit or scope.

What is claimed is:

1. A method of forming a plastic article from a sheet of plastic material heated to a predetermined forming temperature, comprising the steps of:
   (a) providing a first mold section having forming surfaces defining a forming cavity, the first mold section including at least one undercut forming element movable between an advanced position wherein the forming element projects into the forming cavity to form an undercut portion in the plastic article and a retracted position wherein the forming element is withdrawn from the forming cavity to enable the formed plastic article to be removed from the forming cavity;
   (b) moving a second mold section along a forming axis in one direction to urge at least a portion of the heated plastic sheet into the forming cavity of the first mold section to form the plastic article while the undercut forming element is in the advanced position;
   (c) moving a stripper plate a first predetermined distance along the forming axis in an opposite direction for partially removing the formed plastic article from the forming cavity by moving the formed plastic article a first predetermined distance in an opposite direction along the forming axis relative to the forming cavity;
   (d) simultaneously with step (c), operating a retracting mechanism to move the undercut forming element to the retracted position as the formed plastic article is moved the first predetrmined distance, the undercut forming element moving with the stripper plate in an opposite direction along the forming axis as the stripper plate travels a first predetermined distance such that the stripper plate, the undercut forming element, and the plastic article are all simultaneously moved in an opposite direction along the forming axis for the first predetermined distance; and
   (e) subsequent to steps (c) and (d), moving the second mold section with the plastic article a second predetermined distance away from the first mold section along the forming axis in an opposite direction relative to both the forming cavity and the undercut forming element to remove the formed plastic article from the forming cavity.

2. The method according to claim 1 including, simultaneously with step (e), the step of maintaining the undercut forming element stationary relative to the forming cavity as the formed plastic article is moved the second predetermined distance.

3. An apparatus for forming a plastic article from a sheet of plastic material heated to a predetermined forming temperature, said apparatus comprising:
   a first mold section having forming surfaces defining a forming cavity, said first mold section including at least one undercut forming element movable between an advanced position wherein said element projects into the forming cavity to form an undercut portion in the plastic article and a retracted position wherein said element is withdrawn from the forming cavity to enable the formed plastic article to be removed from the forming cavity;
   a second mold section axially movable along a forming axis in one direction toward said first mold section for urging at least a portion of the heated plastic sheet into said forming cavity of said first mold section to form the plastic article while said undercut forming element is in said advanced position;
   a stripper plate movable a first predetermined distance along said forming axis in an opposite direction from said one direction for freeing the formed plastic article from the forming cavity by initially moving the formed plastic article said first predetermined distance in said opposite direction along the forming axis relative to the forming cavity; and
   a retracting mechanism coupled to said stripper plate and simultaneously operable with said stripper plate for moving said undercut forming element to said retracted position as the formed plastic article is moved said first predetermined distance, said undercut forming element being axially movable relative to the forming cavity together with said stripper plate in said opposite direction as said stripper plate travels said first predetermined distance;
   said stripper plate, said undercut forming element, and the plastic article all being axially movable with one another in said opposite direction for said first predetermined distance;
   said second mold section movable with the plastic article in said opposite direction away from said first mold section a second predetermined distance along the forming axis relative to both the forming cavity and said undercut forming element to remove the formed plastic article from the cavity.

4. The apparatus according to claim 3 including means for maintaining said undercut forming element stationary relative to the forming cavity as the formed plastic article is moved the second predetermined distance.

* * * * *